(12) United States Patent
Williams et al.

(10) Patent No.: US 10,331,994 B2
(45) Date of Patent: *Jun. 25, 2019

(54) METHOD FOR CREATING CERAMIC-CONTAINING TRANSACTION CARDS

(71) Applicant: American Express Travel Related Services Company, Inc., New York, NY (US)

(72) Inventors: Troy Patrick Williams, New York, NY (US); Peter Bates, West Newton, MA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,080

(22) Filed: Nov. 8, 2017

(65) Prior Publication Data
US 2018/0068212 A1 Mar. 8, 2018

Related U.S. Application Data

(63) Continuation of application No. 15/164,627, filed on May 25, 2016, now Pat. No. 9,836,687.

(51) Int. Cl.
*G06K 7/00* (2006.01)
*G06K 19/077* (2006.01)
(Continued)

(52) U.S. Cl.
CPC .......... *G06K 19/0776* (2013.01); *B32B 37/12* (2013.01); *B32B 37/14* (2013.01); *C04B 35/486* (2013.01); *C04B 35/488* (2013.01); *C04B 35/563* (2013.01); *C04B 35/565* (2013.01); *C04B 35/626* (2013.01); *C04B 35/64* (2013.01); *C04B 37/02* (2013.01); *G06K 7/0004* (2013.01); *G06K 19/07722* (2013.01); *B32B 2038/045* (2013.01); *B32B 2425/00* (2013.01); *C04B 2235/3208* (2013.01); *C04B 2235/3217* (2013.01); *C04B 2235/3224* (2013.01); *C04B 2235/3225* (2013.01); *C04B 2235/3418* (2013.01); *C04B 2235/3427* (2013.01); *C04B 2235/3481* (2013.01); *C04B 2237/40* (2013.01);
(Continued)

(58) Field of Classification Search
CPC ......... G06K 19/0776; G06K 19/07722; G06K 7/0004; C04B 35/626; B32B 37/12; B32B 37/14; B32B 2425/00; B32B 2038/045
USPC .......................................................... 235/488
See application file for complete search history.

(56) References Cited

U.S. PATENT DOCUMENTS 5,488,017 A 1/1996 Szweda et al.
8,308,197 B2 11/2012 Peters et al.
(Continued)

OTHER PUBLICATIONS

Advisory Action dated May 1, 2018 in U.S. Appl. No. 15/409,102.
(Continued)

*Primary Examiner* — Seung H Lee
(74) *Attorney, Agent, or Firm* — Snell & Wilmer, L.L.P.

(57) ABSTRACT

A transaction card includes a card body that may comprise a card body comprising a ceramic material, the card body including a primary surface and a first mating surface. A card backer comprises a metallic material and includes a secondary surface and a second mating surface. A portion of the first mating surface and a portion of the second mating surface are coupled together.

18 Claims, 4 Drawing Sheets

(51) Int. Cl.
  *B32B 37/12* (2006.01)
  *B32B 37/14* (2006.01)
  *C04B 37/02* (2006.01)
  *C04B 35/626* (2006.01)
  *C04B 35/486* (2006.01)
  *C04B 35/488* (2006.01)
  *C04B 35/563* (2006.01)
  *C04B 35/565* (2006.01)
  *C04B 35/64* (2006.01)
  *B32B 38/04* (2006.01)

(52) U.S. Cl.
  CPC .. *C04B 2237/402* (2013.01); *C04B 2237/406* (2013.01); *C04B 2237/52* (2013.01); *C04B 2237/62* (2013.01)

(56) References Cited

U.S. PATENT DOCUMENTS

| | | | |
|---|---|---|---|
| 8,725,589 | B1 | 5/2014 | Skelding et al. |
| 9,836,684 | B2 | 12/2017 | Finn |
| 2005/0194453 | A1 | 9/2005 | Conner |
| 2008/0314995 | A1 | 12/2008 | Varga et al. |
| 2009/0019751 | A1 | 1/2009 | Goetting |
| 2010/0038426 | A1 | 2/2010 | Casden |
| 2014/0070009 | A1 | 3/2014 | Zambrano |
| 2015/0021403 | A1 | 1/2015 | Finn |
| 2015/0069131 | A1 | 3/2015 | Scanlon et al. |
| 2015/0339564 | A1 | 11/2015 | Herslow et al. |
| 2016/0042268 | A1 | 2/2016 | Puttkammer |
| 2016/0110639 | A1 | 4/2016 | Finn et al. |
| 2016/0232438 | A1 | 8/2016 | Williams |
| 2016/0307088 | A1 | 10/2016 | Wurmfeld |

OTHER PUBLICATIONS

Non-Final Office Action dated Jun. 1, 2018 in U.S. Appl. No. 15/409,102.
USPTO; Office Action dated Jan. 10, 2017 in U.S. Appl. No. 15/164,627.
USPTO; Final Office Action dated May 17, 2017 in U.S. Appl. No. 15/164,627.
USPTO; Notice of Allowance dated Aug. 3, 2017 in U.S. Appl. No. 15/164,627.
USPTO; Office Action dated Nov. 17, 2017 in U.S. Appl. No. 15/409,102.
USPTO; Office Action dated Mar. 15, 2018 in U.S. Appl. No. 15/409,102.
USPTO; Final Office Action dated Sep. 14, 2018 in U.S. Appl. No. 15/409,102.

FIG. 4

METHOD FOR CREATING CERAMIC-CONTAINING TRANSACTION CARDS

CROSS REFERENCE TO RELATED APPLICATIONS

This application is a continuation of, claims priority to and the benefit of, U.S. Ser. No. 15/164,627 filed May 25, 2016 and entitled "CERAMIC-CONTAINING TRANSACTION CARDS AND METHODS OF MAKING THE SAME," which is incorporated herein in its entirety.

FIELD

This disclosure generally relates to ceramic-containing transaction cards configured for facilitating payments and methods of making the same. The transaction cards may include other features such as a microchip (e.g., smart card) and one or more antennae.

BACKGROUND

The proliferation of transaction cards (which allow the cardholder to, for example, pay with credit rather than cash) started in the United States in the early 1950s. Initial transaction cards were typically restricted to select restaurants and hotels and were often limited to an exclusive class of individuals. Since the introduction of plastic credit cards, the use of transaction cards have rapidly proliferated from the United States, to Europe, and then to the rest of the world. Transaction cards are not only information carriers and facilitate access to information, but also typically allow a consumer to pay for goods and services, without the need to constantly possess cash. If a consumer needs cash, transaction cards allow access to funds through, for example, an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in a need for companies to differentiate their cards from competitor's cards.

Initially, the transaction cards often included the issuer's name, the cardholder's name, the card number, and the expiration date embossed onto the card. The cards also usually included a signature field on the back of the card for the cardholder to provide a signature to help protect against forgery and tampering. Thus, the cards served as devices to provide data to merchants and the card security included the comparison of the cardholder's signature on the card to the cardholder's signature on a receipt along with the embossed cardholder's name on the card.

Due to the popularity of transaction cards, numerous companies, banks, airlines, trade groups, sporting teams, clubs and other organizations have developed their own transaction cards. As such, many companies continually attempt to differentiate their transaction cards and increase market share, not only by offering more attractive financing rates and low initiation fees, but also by offering unique, aesthetically pleasing features on the transaction cards. As such, many transaction cards include not only demographic and account information, but the transaction cards also include graphic images, designs, photographs and security features.

Administrative and security issues (e.g., charges, credits, merchant settlement, fraud, reimbursements, etc.) have increased due to the increasing use of transaction cards. Thus, the transaction card industry started to develop more sophisticated transaction cards which allowed the electronic reading, transmission, and authorization of transaction card data for a variety of industries. For example, magnetic stripe cards, optical cards, smart cards, and calling cards have been developed to meet the market demand for expanded features, functionality, and security. In addition to the visual data, the incorporation of a magnetic stripe on the back of a transaction card allows digitized data to be stored in machine readable form. As such, magnetic stripe readers are used in conjunction with magnetic stripe cards to read the digitized data (e.g., account information and expiration date), then communicate the digitized data and the purchase data received on-line from a cash register device to a host computer.

Due to the susceptibility of the magnetic stripe to tampering, the lack of confidentiality of the information within the magnetic stripe and the problems associated with the transmission of data to a host computer, integrated circuits were developed which may be incorporated into transaction cards. These integrated circuit (IC) cards, known as smart cards, proved to be very reliable in a variety of industries due to their advanced security and flexibility for future applications. However, even integrated circuit cards are susceptible to counterfeiting.

As magnetic stripe cards and smart cards developed, the market demanded international standards for the cards. The card's physical dimensions, features and embossing area were standardized under the International Standards Organization ("ISO"), ISO 7810 and ISO 7811. The issuer's identification, the location of particular compounds, coding requirements, and recording techniques were standardized in ISO 7812 and ISO 7813, while chip card standards were established in ISO 7813. For example, ISO 7811 defines the standards for the magnetic stripe which is a 0.5 inch stripe located either in the front or rear surface of the card and which is divided into three longitudinally parallel tracks. The first and second tracks hold read-only information with room for 79 alphanumeric characters and 40 numeric characters, respectively. The third track is reserved for financial transactions and includes enciphered versions of the user's personal identification number, country code, currency units, amount authorized per cycle, subsidiary accounts, and restrictions.

More information regarding the features and specifications of transaction cards can be found in, for example, Smart Cards by Jose Luis Zoreda and Jose Manuel Oton, 1994; Smart Card Handbook by W. Rankl and W. Effing, 1997, and the various ISO standards for transaction cards available from ANSI (American National Standards Institute), 11 West 42nd Street, New York, N.Y. 10036.

The incorporation of machine-readable components onto transactions cards encouraged the proliferation of devices to simplify transactions by automatically reading from and/or writing onto transaction cards. Such devices include, for example, bar code scanners, magnetic stripe readers, point of sale terminals (POS), automated teller machines (ATM) and card-key devices.

Typical transaction cards are made from thermoplastic materials, such as polyvinyl chloride (PVC) and polyethylene terephthalate (PET). However, these transaction cards are susceptible to being damaged or destroyed if exposed to damaging environments. For example, transaction cards may be damaged if left exposed to the elements for an extended period of time. Moisture and/or sunlight may break down the chemical bonds within the polymers of typical transaction cards, such that transaction cards left exposed to moisture and sunlight may become warped, cracked and/or unusable. In addition, thermoplastic transaction cards may be easily bent or may be broken or cut, thereby damaging the transaction card and rendering it unusable.

Therefore, a need exists for a transaction card that has both strength and durability. Moreover, a need exists for a transaction card that withstands exposure to the elements, such as moisture or sunlight.

SUMMARY

The disclosed transaction card may include a card body comprising a ceramic material, the card body including a primary surface and a first mating surface, a card backer comprising a metallic material and including a secondary surface and a second mating surface, wherein a portion of the first mating surface and a portion of the second mating surface are coupled together, a card body comprising a ceramic material, the card body including a primary surface and a secondary surface, a laser marked feature disposed on the card body and a laser etched feature disposed on the card body.

A method of making a transaction card comprises forming a ceramic material slurry comprising a ceramic material and a binder, forming a green body from the ceramic material slurry, firing the green body at a firing temperature to create a fired green body, grinding the fired green body into a card body, polishing a primary surface of the card body, and coupling the card body to a card backer, the card backer comprising a metallic material.

Additional features and advantages of the present invention are described in, and will be apparent from, the detailed description of the presently preferred embodiments and from the drawings.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

A transaction card may be a charge card, credit card, debit card, awards card, prepaid card, telephone card, smart card, magnetic stripe card, bar code card, transponder, radio frequency card and/or the like. The transaction card may have an associated account number (e.g., embossed, printed, and/or accessed), which cardholders typically present to merchants or use to interact with a machine, as part of a transaction, such as a purchase.

An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, ceramic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a radio frequency identifier (RFID), a biometric, a geographic indicator and/or the like. The card may be associated with, have access to or include a rewards account, charge account, credit account, debit account, prepaid account, telephone card, embossed card, smart card, magnetic stripe card, bar code card, transponder, radio frequency card, key card, access card or an associated account.

Ceramic-containing transaction cards and methods of making the same are provided herein. In various embodiments, a hybrid transaction card that comprises a ceramic card body and a metallic card backer is disclosed. Monolithic ceramic transaction cards, which have card bodies that are made completely of a ceramic material, tend to be robust. However, reinforcement of a ceramic card body portion with a card backer, such as a metallic card body portion, may improve durability and resistance to shock. A metallic card backer may also act in concert with an RF transmitter device to improve RF signal distribution.

ISO 7810 stipulates that transaction cards in the "ID-1" format be 85.60 mm in width×53.98 mm in height×0.76 mm in thickness (3.370 in×2.125 in×0.03 in) (as the terms width, height, and thickness are further discussed herein). At aspect ratios at or near the width to height ratio set forth in ISO 7810 (a width to height ratio of between about 1.4 to about 1.8, or a width to height ratio of about 1.6, wherein the term "about" in this context only means+/−0.05), the brittleness of ceramic materials may vary in accordance with thickness. Thus, a ceramic card body portion of 0.30 in. in thickness will be more brittle than a ceramic card body portion of, for example 0.13 in. In that regard, it may be desirable to produce a ceramic card body at a thickness of less than 0.02 in., less than 0.015 in., 0.013 in., less than 0.01, and between 0.009 inches and 0.014 inches in, while maintaining width to height ratio of between about 1.4 to about 1.8, wherein the term "about" in this context only means+/−0.05.

The transaction cards may be standard-sized (i.e., about 3⅜ inches by about 2¼ inches by about 0.03 inches, and/or those dimensions specified in ISO 7810 and ISO 7811, for example, for an "ID-1" card) or any other size specified in ISO 7810 and ISO 7811 or any other size or configuration still usable as a transaction card (e.g., a larger transaction card, small transaction card, reduced size transaction card, foldable transaction card, the card being part of another device, the card being removed from another device). Moreover, the transaction card may have a magnetic stripe, an embedded microchip, a signature panel, a holographic image, and/or any feature typically contained on or within a transaction card. The transaction cards may have a card body comprised of a ceramic material. Various foldable cards and/or transaction cards of non-traditional size may be found in the below U.S. Patent documents, all of which are herein incorporated by reference in their entirety: U.S. patent application Ser. No. 10/906,731 filed on Mar. 3, 2005 and entitled System and Method for Non-Traditionally-Sized RF Transaction Card, U.S. patent application Ser. No. 10/906,732 filed on Mar. 3, 2005 and entitled Foldable Non-Traditionally-Sized RF Transaction Card System and Method, which issued as U.S. Pat. No. 7,156,301 on Jan. 2, 2007, U.S. patent application Ser. No. 10/436,343 filed on May 12, 2003 and entitled Compact or Convenient Transaction Cards, which issued as U.S. Pat. No. 7,124,955 on Oct. 24, 2006, and U.S. patent application Ser. No. 10/733,619 filed on Dec. 10, 2003 and entitled Foldable Transaction Card Systems, which issued as U.S. Pat. No. 7,147,151 on Dec. 12, 2006.

A card body may refer to a material in any shape or thickness. The card body may be shaped substantially as a transaction card and/or a layer of a transaction card. In that regard, the card body may be generally sized as a transaction card though it may not meet ISO 7810 and/or 7811 dimensions. A layer of a transaction card may refer to a material that has the length and width (as defined herein) substantially near the ISO 7810 and/or 7811 specified dimensions but has a thickness (as defined herein) less than the ISO 7810 and/or 7811 specified dimensions. In that regard, a hybrid transaction card may comprise a layer of metal or plastic bonded, laminated and/or otherwise coupled to a layer of a ceramic material. In various embodiments, a card body may have the width and height of an ID-1 card as set forth in ISO 7810 and ISO 7811, but may have a thickness that is less than the thickness of an ID-1 card as set forth in ISO 7810 and ISO 7811. For example, a card body may have a thickness of less than 0.02 in., less than 0.015 in., 0.013 in., less than 0.1, and between 0.009 inches and 0.014 inches.

In various embodiments, a card body may comprise a ceramic material. A ceramic material may comprise any suitable ceramic as well as any suitable binder, dopant, or other adjunct (e.g. a dye) that may impart one or more physical characteristics to the ceramic. A ceramic material may comprise zirconium dioxide (zirconia), silicon carbide, boron carbide, or the like. Suitable dopants include yttria ($Y_2O_3$), calcium oxide, aluminum oxide, silicon dioxide, and other rare earth metals and their oxides. Suitable binders may include sodium silicate, magnesium aluminum silicates, polyvinyl alcohol, starches, carboxymethylcellulose, dextrin, and various the like. Various dyes may be used to alter the color of any portion or all of the card body.

In various embodiments, a card body may comprise a monolithic ceramic. A monolithic ceramic may be a ceramic material that is formed (e.g., fired or sintered) without the use of reinforcing fibers. In that regard, a monolithic ceramic is fired and/or sintered as one component. However, in various embodiments, a card body may comprise a fiber reinforced ceramic. As used herein, a "fiber reinforced ceramic" may comprise any fiber material that is reinforced with a ceramic material. For example, a carbon fiber-reinforced polymer may comprise carbon fiber reinforced with a ceramic material. In that regard, a fiber reinforced ceramic may include a fibrous material such as carbon fibers, aramid fibers, fiberglass fibers, or similar fibers reinforced with a ceramic material, such zirconia and/or silicon carbide. Fibrous reinforced polymers tend to have a high strength to weight ratio, typically allowing for a stiff component to be produced with relatively light weight.

Ceramic materials that have undergone firing and/or sintering (i.e., fired ceramic materials) may be subject to grinding. In that regard, any suitable abrasive may be used to grind a fired ceramic material. For example, a grinding wheel, grinding belt, or abrasive powder may be used to grind a fired ceramic material. Grinding may proceed under dry conditions or wet conditions.

Grinding may be used to create a chamfered edge on a card body. A chamfered edge is a beveled edge connecting two surfaces. A beveled edge is an edge of a structure that is not perpendicular to the faces of a card body. Grinding may be used to create a chamfered edge of a card body.

Grinding may be used to create a rounded edge on a card body. A rounded edge is a semi-cylindrical edge connecting two surfaces. Grinding may be used to create a rounded edge of a card body.

Grinding may also be used to create a bullnose edge on a card body. A bullnose edge may comprise two convex surfaces extending from each of a primary card surface and a secondary card surface to converge on a surface that is 90 degrees or about 90 degrees from the primary card surface and the secondary card surface, where the term about in this context only means+/−5 degrees. Grinding may be used to create a bullnose edge of a card body.

Fired ceramic materials may be subject to polishing, for example, after grinding. In that regard, any suitable polishing and/or buffing technique may be used to polish a fired ceramic material. For example, a polishing cloth or other textile may be used, with or without polishing aids such as polishing wax or polishing paste, may be applied to a fired ceramic materials. Buffing may be performed with commercially available buffing equipment. Polishing and/or buffing may cause a fired ceramic material to have a glossy and/or highly reflective finish.

In various embodiments, as described herein, a card body may comprise a fired ceramic material. The card body may be polished and/or buffed to a glossy, highly reflective finish. In various embodiments, one or more lasers may be used to alter the card body. A laser may emit a focused beam of light having a given power output. Thus, a laser directed at a surface may have varying effects on the surface based upon the power output of the laser and the duration of exposure. Lasers may emit a light over a small area, providing the ability for precision works. Moreover, lasers may be accurately and precisely controlled via electronic control systems for manufacturing ease. A typical laser may be obtained from Virtek Laser Solutions, Inc. In various embodiments, a 1064 nm, 25 W diode pumped $YVO_4$ laser may be used.

The effect a laser may have on a ceramic material depends in part on the power output of the laser and the duration of exposure. For example, exposure for a short time to a low power laser may alter the surface characteristics of a ceramic material, for example, changing a glossy finished surface to a matte finish (i.e., one that is not as reflective to visible light). In contrast, exposure to a high power output laser for a first duration, or a lower power output laser for a second duration that is longer than the first duration, may cause a perforation of the ceramic material. In that regard, various laser processes may be characterized by their effect on a ceramic material. These various techniques may be applied, in various embodiments, in the manufacture of a transaction card. Lasers can provide marking of ceramic materials at depths of as low as about 0.0003 inches. Though lasers may have various power outputs, for purposes of explanation, various laser processes may be characterized by the total power during the exposure to a ceramic material. Stated another way, the total power of laser exposure to a surface may be thought of as the amount of laser energy applied per unit time of exposure.

As used herein, "laser finishing" may refer to application of a laser to a ceramic material (e.g., a card body comprising a ceramic material) to remove and/or disrupt a glossy and/or highly reflective finish. In that regard, laser finishing may impart a matte finish on a ceramic material surface.

As used herein, "laser marking" may refer to application of a laser to a ceramic material (e.g., a card body comprising a ceramic material) to impart a visible disruption to the ceramic material surface. For example, laser marking may remove a portion of ceramic material from a ceramic material surface. In that regard, laser marking may impart visible features to a ceramic material surface. For example, laser marking may be used to impart readable text onto a ceramic material surface. In various embodiments, account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters may be laser marked onto a ceramic material surface. Laser marking involves the application of more total power from a laser than laser finishing.

As used herein, "laser etch" may refer to application of a laser to a ceramic material (e.g., a card body comprising a ceramic material) to impart an indentation to the ceramic material surface. For example, laser etching may remove a portion of ceramic material from a ceramic material surface. In that regard, laser marking may impart visible features to a ceramic material surface that have a palpable depth. For example, laser etching may be used to impart various graphic features onto a ceramic material surface. In various embodiments, a logo, a decorative border, a brand name, and/or other features may be laser etched onto a ceramic material surface. Laser etching involves the application of more total power from a laser than laser marking.

As used herein, "laser perforation" may refer to application of a laser to a ceramic material (e.g., a card body comprising a ceramic material) to bore a hole completely through the card body. In that regard, laser perforation may remove all ceramic material in its path. For example, laser etching may completely remove ceramic material from a ceramic material surface, leaving a through hole. In that regard, laser perforation may impart visible features to a ceramic material surface that traverse a thickness (as defined herein) of a card body. For example, laser perforation may be used to impart various graphic features onto a ceramic material surface. In various embodiments, a logo and/or other features may be laser etched onto a ceramic material surface. Laser perforation involves the application of more total power from a laser than laser etching. Laser cutting may be performed with similar laser parameters as laser perforation, but laser cutting may be used to remove ceramic material in any suitable manner.

A card backer may refer to a transaction card shaped material in any shape or thickness. The card backer may be shaped substantially as a transaction card and/or a layer of a transaction card. In that regard, the card backer may be generally sized as a transaction card though it may not meet ISO 7810 and/or 7811 dimensions. A card backer may have the length and width (as defined herein) substantially near the ISO 7810 and/or 7811 specified dimensions but has a thickness (as defined herein) less than the ISO 7810 and/or 7811 specified dimensions. In that regard, a transaction card, according to various embodiments, may comprise a card backer coupled to (by bonding, lamination, and/or other suitable method) a ceramic card body. In various embodiments, a card backer may have the width and height of an ID-1 card as set forth in ISO 7810 and ISO 7811, but may have a thickness that is less than the thickness of an ID-1 card as set forth in ISO 7810 and ISO 7811. For example, a card backer may have a thickness of less than 0.003 in., less than 0.02 in., 0.18 in., less than 0.015, and between 0.001 inches and 0.02 inches.

In various embodiments, a card body may comprise a metallic material. A metallic material may comprise any suitable metal and/or metal alloy, including titanium, titanium alloy, aluminum, aluminum alloy stainless steel, tin, zinc, copper, nickel, chromium, and nickel/chromium alloys. In various embodiments, a card backer may comprise a composite material, such as a carbon fiber reinforced polymeric material.

In various embodiments, a card backer may be coated with a protective coating. The coating may be deposited via physical vapor deposition (PVD) and may comprise titanium nitride and/or titanium carbonitride. In various embodiments, may be coated with a protective coating such as a diamond like carbon (DLC) coating. A DLC coating may be generally amorphous, though portions of a DLC coating may have a crystalline structure. For example, a DLC coating may comprise a mixture of forms of carbon, including graphite and diamond. In that regard, carbon in a DLC coating may contain hybridized carbon. A DLC coating may comprise a carbon composition that exhibits high hardness, corrosion resistance, low coefficient of friction (−0.02 to 0.2), and high electrical resistivity. A DLC coating may be between 1 micron and 50 microns thick, between 2 microns and 25 microns thick, and between 2 microns and 15 microns thick. A DLC coating may be applied by PVD process, for example, cathodic arc PVD, sputtering, or plasma assisted chemical vapor deposition (CVD).

In various embodiments, a hybrid transaction card having a ceramic card body and metallic card backer may provide improved impact resistance relative to transaction cards having a ceramic card body without a backer that comprise a thickness of about 0.02 in to 0.03 in. The reduced brittleness of a ceramic card body having a thickness of less than 0.02 in combined with the elasticity of a metallic card backer may improve impact resistance. Moreover, if a ceramic card body in a hybrid transaction card were to shatter, the pieces of the ceramic card body may be retained on the metallic card backer. This improves the likelihood that the hybrid transaction card will still be functional to facilitate transactions, and may also reduce the possibility of loss of the ceramic card body. In various embodiments, an adhesive retains the ceramic card body to the metallic card backer.

Figure 1:
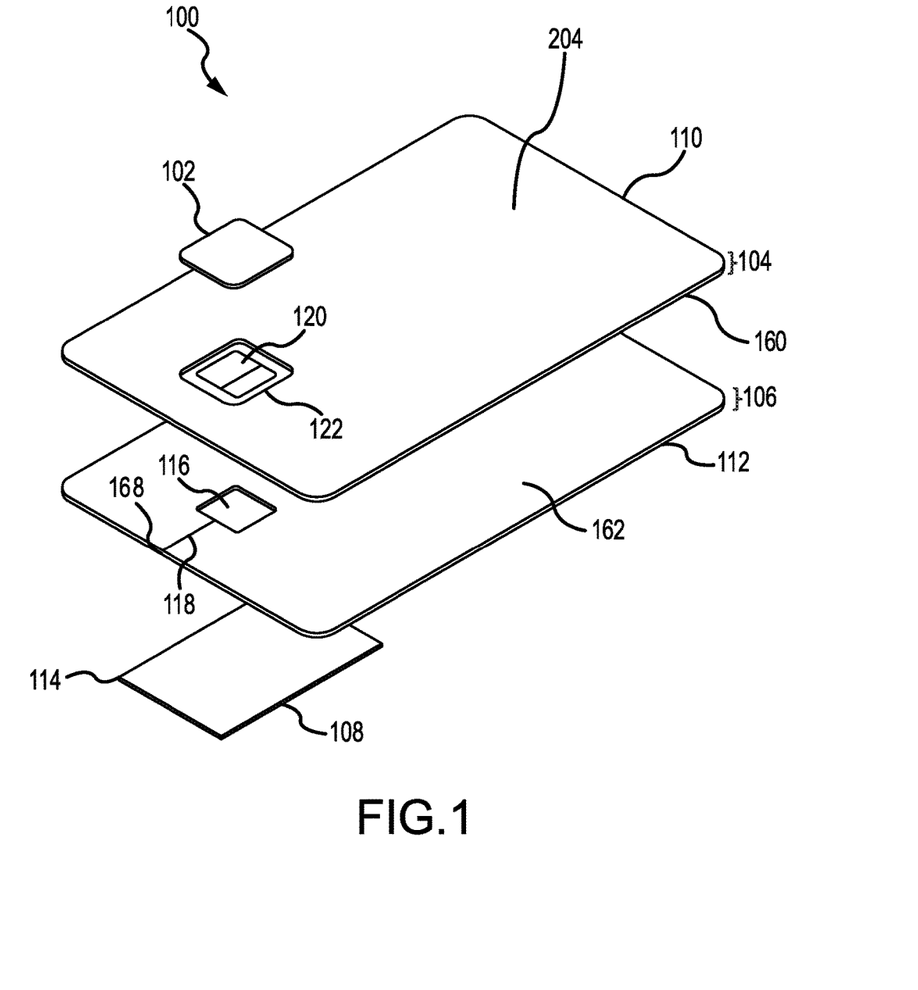
FIG. 1 illustrates an exploded view of a hybrid transaction card, in accordance with various embodiments.
Figure 2:
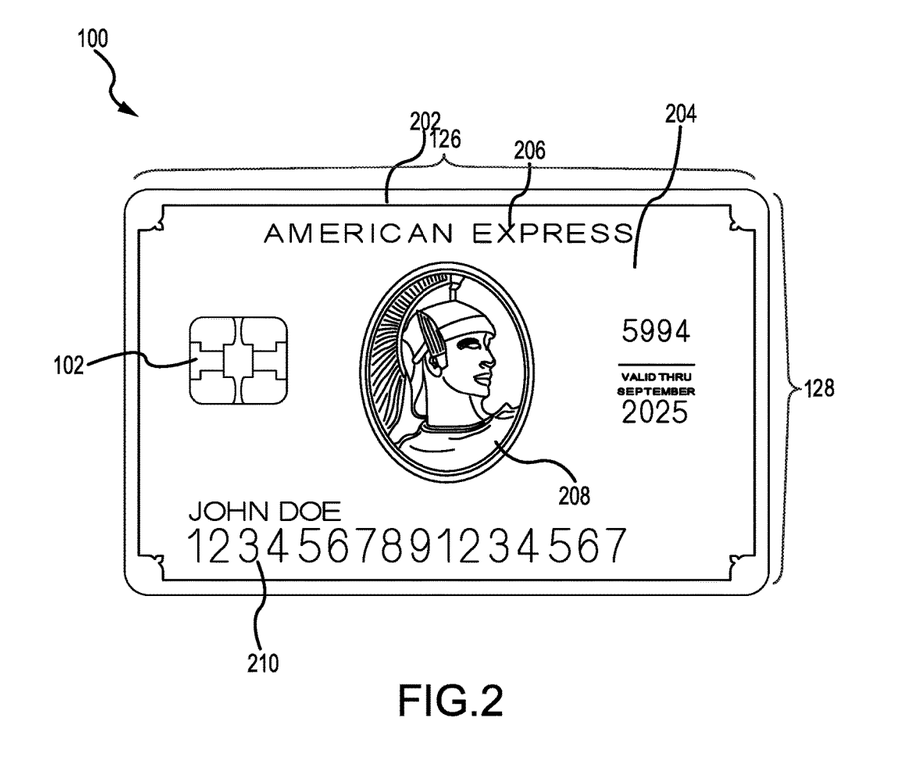
FIG. 2 illustrates a view of a primary surface of a hybrid transaction card, in accordance with various embodiments.
Figure 3:
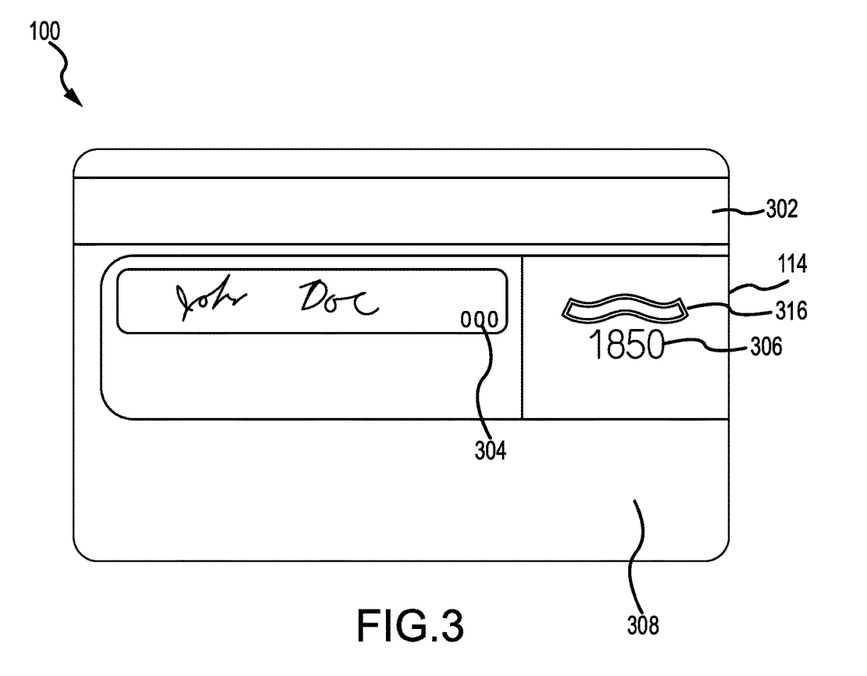
FIG. 3 illustrates a view of a secondary surface of a hybrid transaction card, in accordance with various embodiments.

Referring now to the drawings, FIGS. 1, 2 and 3 illustrate a hybrid transaction card 100 showing primary surface 204. The hybrid transaction card 100 may be composed of card body 110 which comprises a ceramic material. Width 126 is shown relative to height 128. Card body 110 has thickness 104. Card backer 112 has thickness 106. Primary surface 204 contains various features that are produced through laser marking, laser finishing, laser etching, and laser perforation, as described herein.

Primary surface 204 may comprise one or more of a matte surface and a glossy surface. In various embodiments, primary surface 204 may be polished to a glossy, highly reflective surface. Laser finishing may be used to transform a portion of the glossy surface to a matte finish.

Hybrid transaction card 100 may comprise pocket 122. Pocket 122 may comprise an indentation or other depression that is offset from primary surface 204. Microchip 102 is disposed in pocket 122. The position of microchip 102 on the hybrid transaction card 100 may be standardized by industry practice (for example, ISO 7816). Microchip 102 may include an integrated antenna so that microchip 102 may facilitate wireless transactions. Microchip 102 may comprise any suitable recordable media, for example, an integrated circuit. Microchip 102 may comply with one or more industry standards such as ISO 7819 and ISO 7816 to provide "smartcard" functionality to hybrid transaction card 100. In that regard, microchip 102 may aid in the facilitation of financial transactions. Many jurisdictions may now prefer a microchip in transaction cards. Microchip 102 may be disposed onto a card body in a variety of ways. Pocket 122 may be formed so that when microchip 102 is disposed therein, a surface of microchip 102 will be flush or substantially flush with primary surface 204. An adhesive may be disposed in the pocket 122 or on the microchip 102 prior to positioning a microchip 102 into a pocket 122 in hybrid transaction card 100. Any suitable adhesive may be used. For example, ABLEBOND 931-1T1N1 may be used for this purpose. Further, in various embodiments, an insulating material may be disposed in the card body pocket to be positioned between the microchip and the card body so as to electrically insulate the microchip and the card body. An adhesive may act as an insulating material. Any insulator may be used for this purpose.

Laser marked feature 210 is disposed on primary surface 204. Laser marked feature may be produced by laser marking, as discussed above. In various embodiments, laser marked feature may include account indicia such as an account number, an accountholder's name, a loyalty notation (e.g., "Member Since 2001"), an expiration date, a signature, a brand name 206, or other indicia such as legal notices, regulatory compliance messages, phone numbers, URLs, email addresses, trademarks 206, pictures, graphics, bar codes, CCID code or any alphanumeric characters.

Laser etched feature 202 is disposed on primary surface 204. Laser etched feature may be produced by laser etching, as discussed above. In various embodiments, laser etched feature may include a logo, and/or a decorative feature such as a border, though other patterns are contemplated herein.

Secondary surface 308 may comprise fill panel 114. Fill panel 114 may comprise a ceramic material, for example, the same ceramic material of card body 110. Fill panel 114 may have thickness 108. Thickness 108 may be from about 0.001 in to about 0.01 in, about 0.003 in to about 0.009 in and/or about 0.008 in, wherein the term about may refer to +/−0.0001 in. Fill panel 114 may be coupled to card backer 112 by an adhesive or other suitable coupling method.

Fill panel 114 may comprise a gloss/matte feature. A gloss/matte feature may comprise a feature that comprises a gloss portion 306 and matte portion 316. Together, gloss portion 306 and matte portion 316 may be configured to display account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters. In that regard, alphanumeric characters may be formed as gloss portion 306 against background of matte portion 316.

Magnetic stripe 302 may be disposed on secondary surface 308. Magnetic stripe 302 may comprise any suitable recordable media. Magnetic stripe 302 may be encoded via any encoding processes commonly used to encode the transaction cards. Specifically, either or both of the recordable media, such as the magnetic stripe and/or the microchip, may be encoded to provide hybrid transaction card 100 with information beneficial to facilitate a financial transaction. The recordable media may be read via a magnetic stripe reader or a microchip reader.

Secondary surface 308 may comprise laser marked feature 304. Laser marked feature 304 may comprise marked feature may include account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters.

Card backer 112 may comprise any suitable metal and/or metal alloy, including titanium, titanium alloy, aluminum, aluminum alloy stainless steel, tin, zinc, copper, nickel, chromium, and nickel/chromium alloys. Card backer 112 may comprise second mating surface 162. All or a portion of second mating surface 162 may contact all or a portion of first mating surface 160 of card body 110, with first mating surface 160 being opposite primary surface 204. First mating surface 160 may be coupled to second mating surface 162 by any suitable means. For example, first mating surface 160 may be coupled to second mating surface 162 by any suitable adhesive. Suitable adhesives may include various epoxies, glues, cements, and the like.

Card body 110 includes aperture 120. Aperture 120 is disposed within pocket 122. Aperture 120 may overlap aperture 116 of card backer 112. Slit 118 extends from the aperture 116 to exterior edge 168 of the card backer 112. Slit 118 may pass through the entire thickness of card backer 112, though in various embodiments slit 118 may be a score or channel. Slit 118 may aid in distribution of RF signals from microchip 102 through card backer 112.

Figure 4:
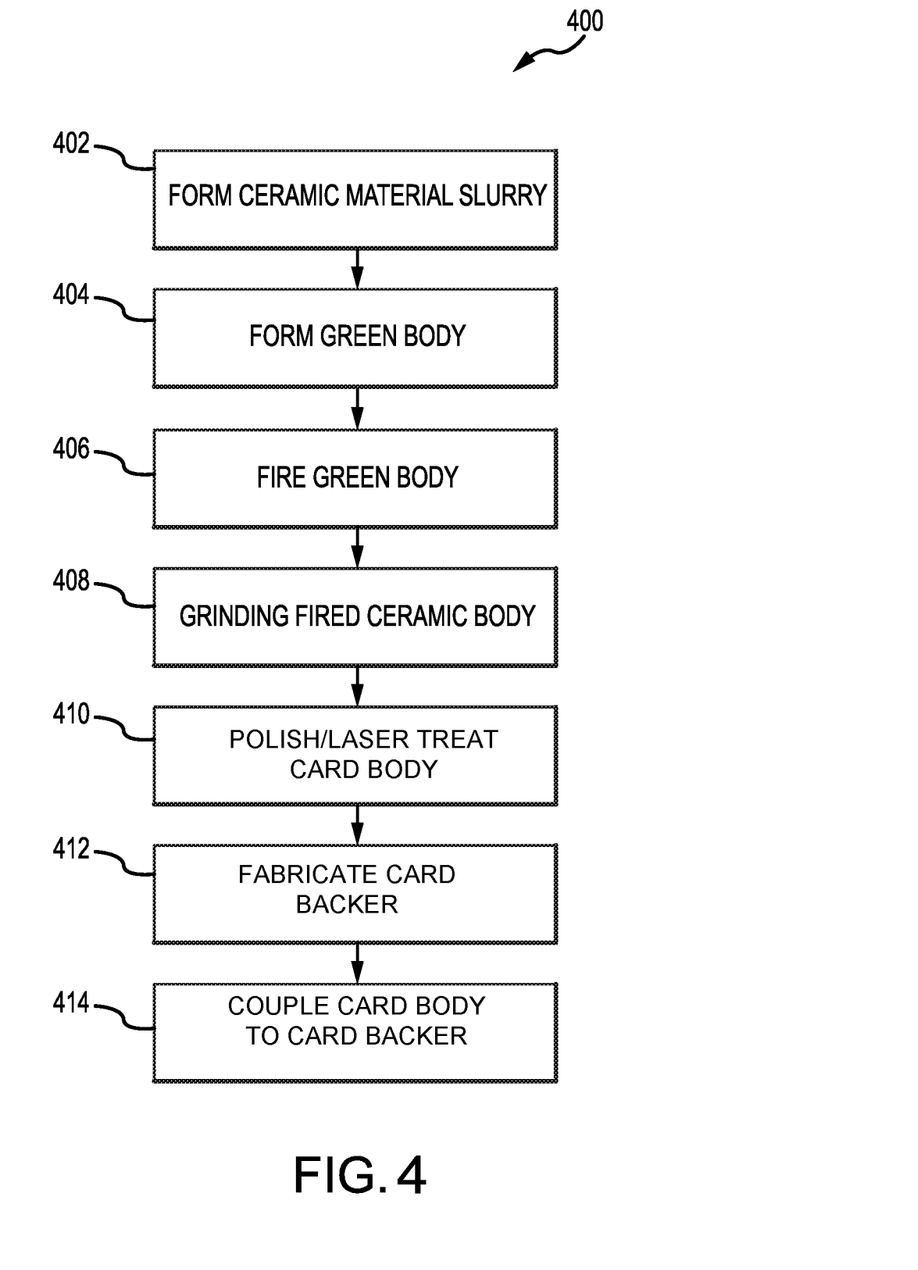
FIG. 4 illustrates a method of making a hybrid transaction card, in accordance with various embodiments.

With reference to FIG. 4, method 400 is shown of manufacturing a hybrid transaction card, such as hybrid transaction card 100. A ceramic material slurry may be formed in step 402. A ceramic material slurry may comprise a solid phase and a liquid phase. The liquid phase may comprise water, an alcohol, or any other suitable liquid for use in ceramic material slurries. The solid phase may comprise any suitable ceramic material as well as any suitable binder, dopant, or other adjunct (e.g. a dye) that may impart one or more physical characteristics to the ceramic. A ceramic material may comprise zirconium dioxide (zirconia), silicon carbide, boron carbide, or the like. Suitable dopants include yttria ($Y_2O_3$), calcium oxide, aluminum oxide, silicon dioxide, and other rare earth metals and their oxides. Suitable binders may include sodium silicate, magnesium aluminum silicates, polyvinyl alcohol, starches, carboxymethylcellulose, dextrin, and various the like. Various dyes may be used to alter the color of a card body. Dopants, dyes, adjuncts, and ceramic materials may take the form of a powder. In various embodiments, zirconia and yttria comprise a solid phase of a ceramic material slurry. In various embodiments, zirconia comprises a solid phase of a ceramic material slurry. The proportion of liquid phase to solid phase in the ceramic material slurry may be adjusted according to various manufacturing parameters.

A ceramic material slurry may be formed into a green body in step 404. A green body may take the shape of a card body. In that regard, a green body generally having the shape of a transaction card in accordance with an ID-1 transaction card as defined by ISO 7810 and/or ISO 7811 is formed. In various embodiments, the green body may comprise a card body having dimensions of about 5% to 20% greater than the dimensions of a transaction card in accordance with an ID-1 transaction card as defined by ISO 7810 and/or ISO 7811. In various embodiments, the green body may comprise a card body having dimensions of about 10% to 15% greater than the dimensions of a transaction card in accordance with an ID-1 transaction card as defined by ISO 7810 and/or ISO 7811. It should be noted that a pocket such as pocket 122 may be formed into the green body prior to firing. However, in various embodiments, pocket 122 may be laser cut into a card body. In further embodiments, a green body may not have a pocket 122 and, after firing, pocket 122 may be formed by machining and/or grinding.

A green body may be fired in step 406. A green body may be fired in any suitable manner. For example, a green body may be placed in a furnace and exposed to elevated temperatures for a given period of time to form a fired green body. In various embodiments, the green body comprises zirconia. Firing may cause the green body to contract, thus decreasing its volume. In various embodiments, a green body may lose 10% of its volume during firing. In that regard, it is beneficial to size the green body so that the fired green body has dimensions larger than a transaction card in accordance with an ID-1 transaction card as defined by ISO 7810 and/or ISO 7811.

The fired green body may be subject to grinding in step 408 to form a ground card body. Grinding may proceed according to any suitable technique, for example, use of a grinding wheel or belt. Grinding may be dry or may occur under liquid media. Grinding may be used to reduce the size of the fired green body to dimensions that are within the specification for a transaction card in accordance with an ID-1 transaction card as defined by ISO 7810 and/or ISO 7811. Grinding may also impart a chamfered edge to the fired green body. A chamfered edge may provide a pleasing tactile profile, as well as prevent a sharp edge from developing.

The ground card body may be subject to polishing in step 410 to form a polished card body. Polishing may proceed according to any suitable technique, for example, use of a polishing cloth with or without a polishing media such as polishing paste. Step 410 may comprise buffing according to any suitable buffing technique. Step 410 may result in imparting a glossy, highly reflective surface to the ground card body.

The polished card body may be subject to laser treatment and polishing in step 412. As discussed above, laser treatment may comprise laser finishing, laser marking, laser etching, and laser perforation. In that regard, laser finishing, laser marking, laser etching, and laser perforation may be performed on the polished card body to create the various features described in connection with those techniques. In various embodiments, a single laser is used for laser treating and set to different total power outputs to accomplish each task. Certain indicia, such as a cardholder's signature, may be captured digitally and used as a digital template to guide the laser in laser marking the cardholder's signature. The polished card body may have recordable media applied such as a magnetic stripe. A magnetic stripe may be disposed on the card body using an adhesive or other suitable coupling media. A microchip may be installed in the pocket as described herein.

A metallic card backer may be fabricated in step 412. Fabrication may include machining, grinding, casting, forging, water jet cutting, die cutting, laser cutting, plasma cutting and stamping, as well as by additive manufacturing techniques. An aperture such as aperture 116 and slit such as slit 118 may be formed in the card backer.

The metallic card backer and the ceramic card body may be coupled in step 414. Coupling may be performed by disposing an adhesive on the first mating surface of the ceramic card body and the second mating surface of the metallic card backer. Heat curing may be employed if beneficial to the adhesion process.

Hybrid transaction cards have a number of advantages over conventional transaction cards comprised of plastic or metal. Ceramic materials may be very hard and thus hybrid transaction cards may resist scratching. Hybrid transaction cards may be more resistant to deformation that plastic or metal. Combinations of various features found in hybrid transaction cards described herein may be very difficult to reproduce without costly equipment and know-how. Thus, the risk of fraudulent reproduction of ceramic transaction cards is reduced, thus leading to more security. Hybrid transaction cards may further provide a luxurious look and feel, which may be beneficial in the marketplace.

In various embodiments, card and related systems may be configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

In various embodiments, cards, components, modules, and/or engines of the system may be implemented in association with micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, any terms similar to "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

The card or associated systems may include or interface with any accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the card, system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled. For example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.envco.com/default.aspx.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A transaction card comprising:
a card body comprising a ceramic material;
a card backer coupled to the card body;
a fill panel disposed on the card backer,
wherein the fill panel comprises an exterior surface of the transaction card;
wherein the card backer comprises a card backer aperture,
wherein the card body comprises a card body aperture,
wherein the card backer aperture and the card body aperture at least partially overlap, and
wherein the fill panel completely covers the card body aperture.

2. The transaction card of claim 1, further comprising a pocket disposed in the card body and an integrated RF module disposed in the pocket.

3. The transaction card of claim 1, wherein the card body and the card backer are coupled together by an adhesive.

4. The transaction card of claim 1, wherein the card body has a body thickness of between 0.009 inches and 0.014 inches.

5. The transaction card of claim 4, wherein the card backer has a backer thickness of between 0.001 inches and 0.02 inches.

6. The transaction card of claim 4, wherein the body thickness of the card body and the backer thickness of the card backer combined is 0.03 inches.

7. The transaction card of claim 4, wherein the card body has a width to height ratio of between 1.4 to 1.8.

8. The transaction card of claim 1, wherein the ceramic material comprises at least one of zirconium oxide, zirconium dioxide, boron carbide, or silicon carbide.

9. The transaction card of claim 1, wherein the card backer comprises a metallic material.

10. The transaction card of claim 9, wherein the metallic material comprises at least one of titanium, aluminum, or stainless steel.

11. The transaction card of claim 9, further comprising a laser marked feature disposed on the card body and comprising at least one of an account number, a name, or a loyalty notation.

12. The transaction card of claim 11, wherein the card body comprises a laser matte feature.

13. The transaction card of claim 1, wherein the card backer comprises a slit.

14. The transaction card of claim 13, wherein the slit extends from the card backer aperture to an exterior edge of the card backer.

15. The transaction card of claim 1, wherein the fill panel has a panel thickness of 0.003 inches to 0.009 inches.

16. The transaction card of claim 1, wherein the fill panel comprises a gloss/matte feature.

17. The transaction card of claim 1, wherein the fill panel and the card backer are coupled together by an adhesive.

18. The transaction card of claim 1, wherein the fill panel comprises at least one of zirconium oxide, zirconium dioxide, boron carbide, or silicon carbide.

* * * * *

UNITED STATES PATENT AND TRADEMARK OFFICE
CERTIFICATE OF CORRECTION

PATENT NO. : 10,331,994 B2
APPLICATION NO. : 15/807080
DATED : June 25, 2019
INVENTOR(S) : Troy Patrick Williams and Peter Bates It is certified that error appears in the above-identified patent and that said Letters Patent is hereby corrected as shown below:

On the Title Page

Item (54), delete "Method for Creating Ceramic-Containing Transaction" and therefor insert
-- Ceramic-Containing Transaction Card with a Fill Panel --

Signed and Sealed this
Third Day of September, 2019

Andrei Iancu
*Director of the United States Patent and Trademark Office*